United States Patent [19]
Limb

[11] 3,824,590
[45] July 16, 1974

[54] ADAPTIVE INTERPOLATING VIDEO ENCODER

[75] Inventor: John Ormond Limb, New Shrewsbury, N.J.

[73] Assignee: Bell Telephone Laboratories, Incorporated, Murray Hill, N.J.

[22] Filed: Mar. 26, 1973

[21] Appl. No.: 345,001

[52] U.S. Cl. ............ 340/347 AD, 325/38 B, 178/6, 178/DIG. 3, 332/11 D
[51] Int. Cl. ........................ H04b 1/00, H03k 13/22
[58] Field of Search.. 340/347 AD; 325/38 A, 38 B, 325/38 R; 178/6, DIG. 3; 179/15.55 R; 235/154; 332/11 D

[56] References Cited

UNITED STATES PATENTS

| | | | |
|---|---|---|---|
| 2,921,124 | 1/1960 | Graham | 178/6 |
| 2,949,505 | 8/1960 | Kretzmer | 179/15.6 |
| 3,071,727 | 1/1963 | Kitsopoulos | 325/44 |
| 3,609,552 | 9/1971 | Limb et al. | 325/38 B |
| 3,707,680 | 12/1972 | Gabbard et al. | 325/38 B |

*Primary Examiner*—Charles E. Atkinson
*Assistant Examiner*—Vincent J. Sunderdick
*Attorney, Agent, or Firm*—Daniel D. Dubosky

[57] ABSTRACT

Input samples are subjected to two separate single sample delays such that three consecutive samples are simultaneously available. A first sample is encoded differentially to full precision, and the encoded version is interpolated with the actual value of the third sample to yield an estimate of the second sample. The error between a reconstruction of the first sample and its original value is averaged with the error between the interpolated estimate for the second sample and its original value. This averaged error, which simulates visual integration, is compared with a threshold. If the threshold is exceeded, the second sample is encoded to full precision; otherwise, a predetermined code word is transmitted such that the receiver decodes by means of interpolation. Thereupon, the third sample is encoded to full precision and the process continues. Slope overload correction is also provided.

8 Claims, 4 Drawing Figures

FIG. 2
VARIABLE LENGTH CODE
| LEVEL | CODE | LENGTH |
|---|---|---|
| 0 | 1 | 1 |
| +1 | 0 0 1 | 3 |
| -1 | 0 1 0 | 3 |
| +2 | 0 0 0 1 | 4 |
| -2 | 0 1 1 0 | 4 |
| +3 | 0 0 0 0 1 | 5 |
| -3 | 0 1 1 1 0 | 5 |
| +4 | 0 0 0 0 0 | 5 |
| -4 | 0 1 1 1 1 | 5 |
FIG. 3B
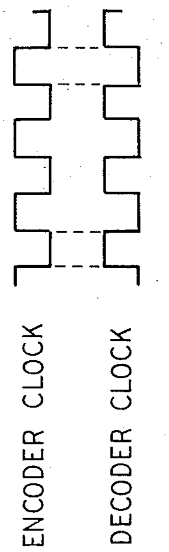
FIG. 3A
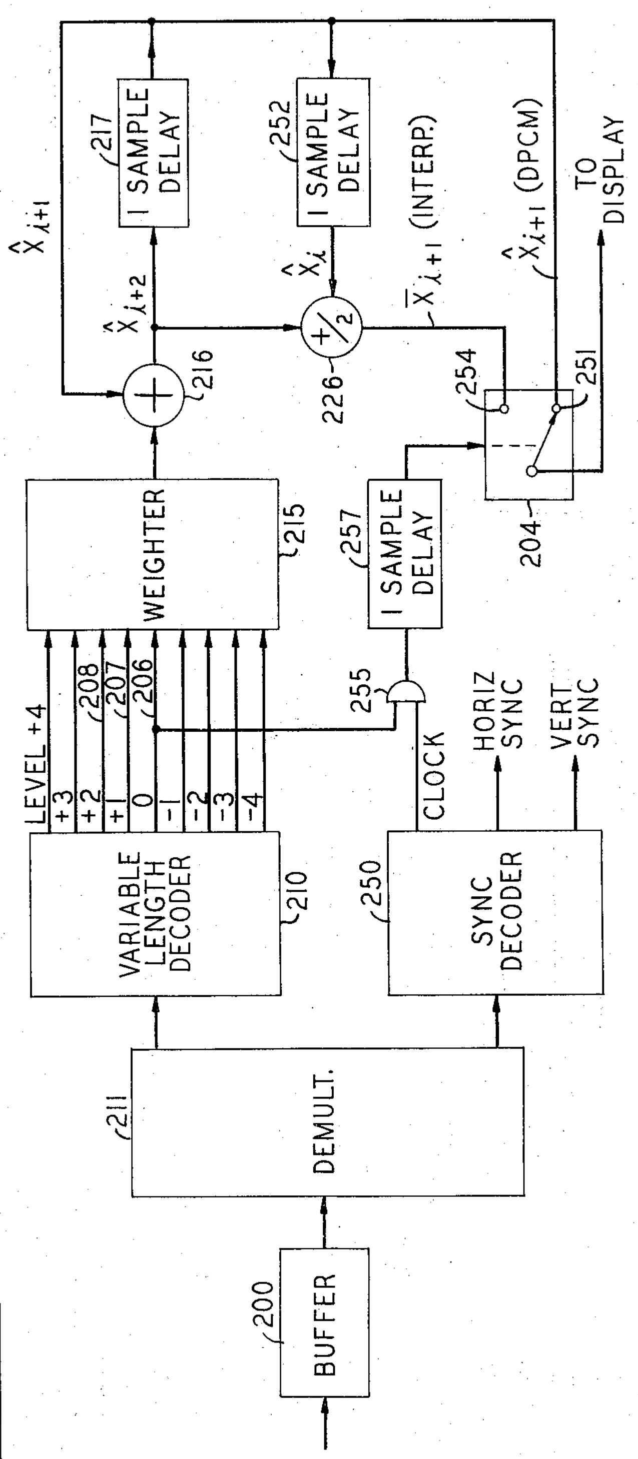

ADAPTIVE INTERPOLATING VIDEO ENCODER

BACKGROUND OF THE INVENTION

This invention relates to video signal processing, and more particularly to methods and apparatus for improving the utilization efficiency of available video transmission bandwidth.

Video frames typically possess substantial correlation between samples spatially proximate to one another. It has therefore been a long standing goal in the design of video process systems to utilize this high degree of correlation in order to improve transmission efficiency. These systems, collectively known as redundancy reduction systems, most often utilize a sample or a set of samples as a predicted version of a sample being encoded. Thereupon, the difference between the sample and its associated predicted value is quantized and transmitted.

In the prior art, a large number of prediction schemes are shown which to a greater or lesser extent improve the efficiency of the video encoding and transmission process. One particular class which shows much promise is the one which utilizes interpolation to capitalize on redundancy of video signals. Encoding apparatus in these systems typically selects samples at a predetermined periodicity and encodes them with full precision, either by means of a differential encoding process or by means of a full sample encoding process. In either case, the samples intermediate the full precision samples are predicted by means of interpolation. In other words, if the interpolated value of full precision samples is within a predetermined range of the corresponding actual sample value, nothing need be transmitted except a flag word, upon receipt of which the decoder produces a reconstruction of the corresponding sample by interpolating associated full precision samples.

In the prior art interpolative encoders, however, if the interpolated value differs markedly from the corresponding actual sample value, interpolation is deemed inexpedient and the sample must be encoded otherwise, either by the same method as were the associated full precision samples, or by some other method.

SUMMARY OF THE INVENTION

The present invention is based on the proposition that even though interpolation might otherwise be deemed an inefficient encoding method for a sample, certain properties of the eye might never be able to detect such encoding error if interpolation were nonetheless utilized. In other words, it has been observed that the human eye possesses certain integration type characteristics whereby samples are apprehended jointly with others, rather than separately. Hence, in order to simulate this phenomenon, the present invention provides for an averaging of successive video error samples. Thereupon, this averaged error, rather than simply the interpolating error, is compared with a threshold to determine whether interpolation is an appropriate encoding method. By averaging the quantizing error of a sample encoded to full precision with the anticipated prediction error brought about by interpolation, the accuracy requirements imposed upon the encoder are relaxed somewhat, since the quantizing error from a fully encoded sample may effectively "cancel out" a portion of the interpolation error from a nearby sample. Therefore, the averaging process provided by the present invention often allows for the use of interpolation even in situations where the interpolation error is large.

In an illustrative embodiment, input samples are coupled to successive single element delays such that three consecutive samples are simultaneously available. Standard encoding apparatus is provided, along with switching means for selectively coupling samples for full precision conversion by the encoder. The switching means is closed during alternate sampling times such that every other sample is encoded to full precision. In order to determine whether an intermediate sample is suitable for an interpolative style of encoding, a first full precision sample is encoded and reconstructed, and the reconstruction is averaged with the actual value of the sample two periods subsequent, thereby producing an interpolated version of the intermediate sample. The quantizing error resulting from the encoding of the first sample is in turn averaged with the difference between the intermediate sample and its interpolated version. This averaged error is compared with a predetermined threshold level which simulates visual acuity. If the averaged error exceeds the threshold, indicating unsuitability for interpolation, the switch to the encoder is closed and the intermediate sample is encoded to full precision. If, however, the averaged error is smaller than the threshold, interpolative prediction is suitable, and the switch to the encoder remains open. Thereupon, the encoder sends a special code word (selected such that transmission thereof is more efficient than transmission of full precision code words) which notifies the receiver that it should decode the corresponding intermediate sample by interpolating adjacent samples.

Utilization of the foregoing principles of interpolation allows for the incorporation of additional features. For example, special slope overload protection is afforded, thereby allowing the encoding process to be adapted more readily to rapidly changing signals. Also, apparatus is provided which allows for specific coding procedures to be utilized when the interpolated value is near zero.

BRIEF DESCRIPTION OF THE DRAWINGS

FIG. 2 shows in tabular form a variable length code which is utilized by the embodiment of FIG. 1;

FIG. 3A shows a decoder which operates in conjunction with the encoder of FIG. 1; and FIG. 3B shows waveforms utilized by the embodiments of FIGS. 1 and 3A.

DETAILED DESCRIPTION

Figure 1:
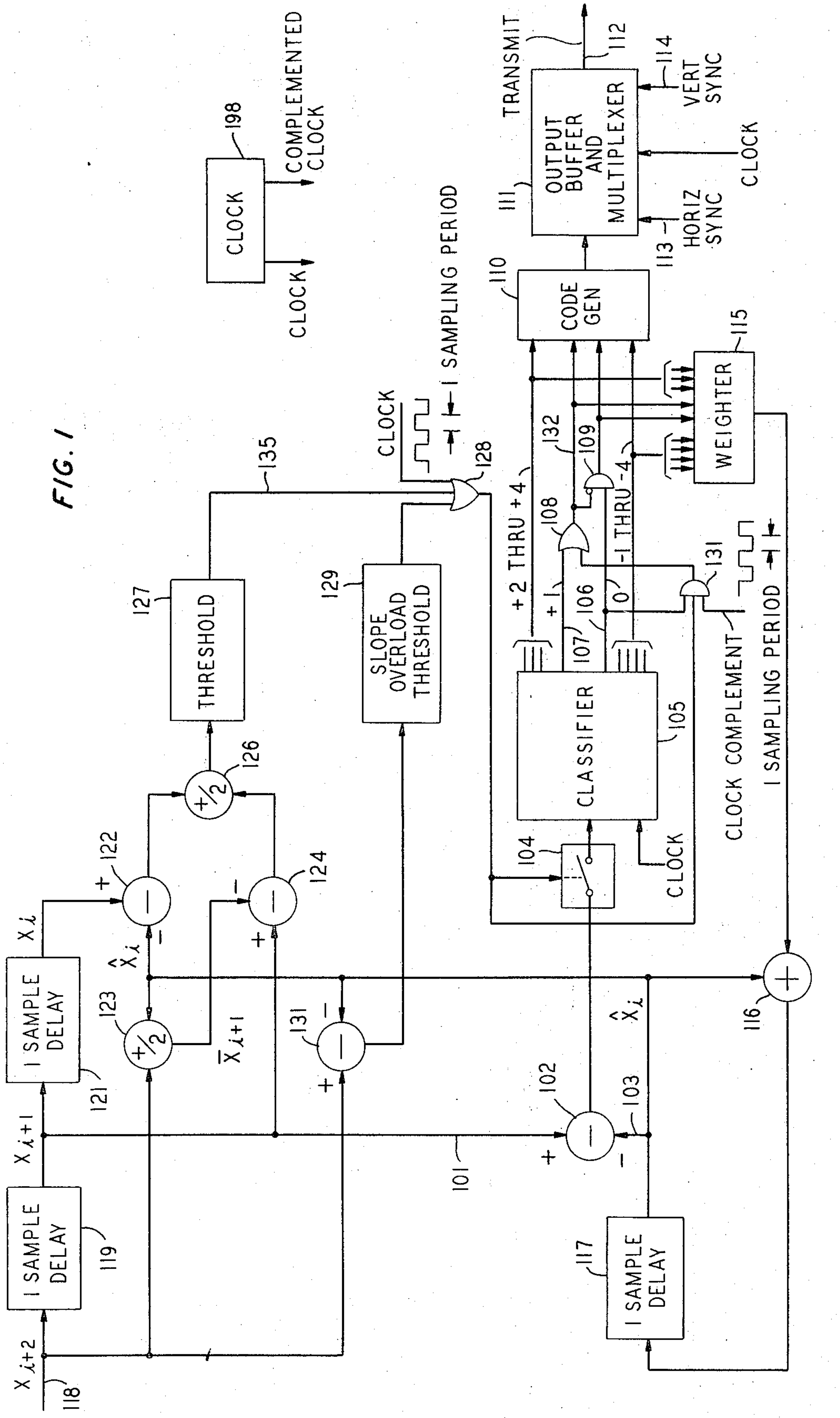
FIG. 1 shows an encoder which embodies the principles of the present invention.

The embodiment of FIG. 1 incorporates the principles of the present invention into a differential pulse code modulation (DPCM) encoder. In other words, the encoder of FIG. 1 operates on a differential sample to sample basis, with a differential being encoded into a binary word, each digit of which represents a different quantum level. Samples to be encoded in a differential fashion are coupled by means of line 101 to the positive input of a subtraction circuit 102. As will be detailed hereinafter, the quantity presented at the negative terminal 103 of the subtraction circuit 102 is a predicted version of the same sample currently appearing on line 101. In accordance with standard DPCM coding procedures, this predicted version which is presented at terminal 103 is nothing more than an integration of previously encoded differentials. Thus, the quantity produced at the output of subtraction circuit 102 represents the differential between a reconstruction of the immediately previous sample (i.e., the predicted value for the instant sample) and the sample to be encoded. It is this differential which is to be quantized and transmitted.

Assuming switching means 104 is closed, the differential is coupled to apparatus designated in FIG. 1 as a classifier 105. The classifier 105 performs the function of comparing the differential with ranges separated by decision levels, each range being represented by a unique output level, whereupon the differential is identified with the output level corresponding to the range in which the differential occurs. Each of a plurality of output wires from the classifier 105 corresponds to a different one of the output levels; in response to the foregoing identification process, the corresponding wire is energized with a logical 1. The classifier 105 is energized by clock pulses and unless a nonzero differential is coupled thereto, the level zero wire 106 is energized by each clock pulse.

Ignoring for the moment an OR gate 108 and an AND gate 109, the operation of which will be detailed hereinafter, the output wires from the classifier 105 are coupled to a code generator 110 and an output buffer and multiplexer 111. The code generator 110 associates output levels, as represented by logical 1 conditions on the wires 106, 107, etc., with output code words. More particularly, the code generator operates in accordance with the table of FIG. 2. For example, if a differential has a magnitude closest to level 4, the code generator 110 is energized to produce the serial code word 01111. The classifier 105 and code generator 110 are embodied as the apparatus shown in U.S. Pat. No. 3,593,141 to E. F. Brown et al.

The output buffer and multiplexer 111 performs the functions of merging all information which must be transmitted, synthesizing it into an appropriate transmission format, and coupling it to a transmission medium 112. Accordingly, horizontal and vertical sync information and clock signals are also coupled to inputs 113 and 114 of the output buffer and multiplexer 111. This information is stuffed into appropriate spaces in the video signal, such as the horizontal and vertical blanking intervals.

Wires 106, 107, etc., are also coupled to a weighting circuit 115 which substantially reverses the procedures occurring in the classifier 105. This arrangement is described in U.S. Pat. No. 3,609,552 to J. O. Limb et al. The weighting circuit 115 provides the simple function of producing a voltage at its output indicative of the output level with which the corresponding input differential was associated in the classifier 105. Thus, the quantity produced by the weighting circuit 115 is a reconstruction of a differential which was encoded by the classifier 105, identified with a level closest in magnitude but not necessarily equal to its actual value, thereby inevitably resulting in the production of a certain amount of error normally referred to as quantizing error.

The reconstructed sample from the weighting circuit 115 is coupled to an accumulator made up of an adder 116 and a one sample delay element 117. Adder 116 and delay element 117 function together to produce a reconstruction of the sample most recently coupled to the subtraction circuit 102 via line 101, which reconstruction is continuously updated by the further inclusion at adder 116 of any reconstructed differential produced by the weighting circuit 115. Hence, in accordance with standard DPCM procedures, the output of the delay element 117 which is coupled to negative input terminal 103 of the subtraction circuit 102 represents a predicted value of the sample, which is coupled to the subtraction circuit 102 via line 101.

In summary, the above described apparatus operates substantially as a standard DPCM converter. Differentials are produced by subtracting a predicted version from the input samples received at line 101. So long as switching means 104 is closed, these differentials are classified into a digital word representing one of a plurality of quantizing levels and are coupled to an output for transmission. Feedback circuitry which includes a weighting circuit and an accumulator reconstructs versions of previous samples and couples them back for use as predicted values.

Input samples are coupled to the input 118 and are subjected to delays by two successive single sampling period delay elements 119 and 121. Thus, three successive samples are at all times available to the coder. In the figure, these samples are designated, in the order of their chronological occurrence, $X_i$, $X_{i+1}$, and $X_{i+2}$. At all times, the sample from the output of the first delay element 119 is the one which is coupled via line 101 to the subtraction circuit 102 for possible differential encoding at the classifier 105. Whether or not that sample is in fact differentially encoded is dependent upon the position of switching means 104. In turn, the position of switching means 104 is primarily established by apparatus which embodies the principles of the present invention.

At such time as a given sample $X_{i+1}$ is being coupled to the subtraction circuit 102, the reconstruction extant at the output of delay element 117 is an approximation of the immediately previous sample, $X_i$. Herein, reconstructed values of a given sample such as $X_N$ are designated $X_N$. Hence, if $X_{i+1}$ appears at line 101, , $X_i$ serves as a predicted value therefore and appears at line 103. In addition, the reconstruction $X_i$ is coupled to the negative terminal of a subtraction circuit 122, the positive terminal of which is provided via the one sample delay element 121 with the actual sample value $X_i$. Hence, the output of subtraction circuit 122 is the quantizing error $X_i - X_i$ which resulted from differentially encoding sample $X_i$.

The reconstruction $X_i$ is also coupled to a combinatorial circuit 123, the other input of which receives the sample $X_{i+2}$. Since combinatorial circuit 123 operates by adding together the two samples presented at its inputs and dividing their sum by two, the quantity produced by combinatorial circuit 123 represents in accordance with the principles of the present invention an interpolated value $X_{i+1} = (X_{i+2} + X_i)/2$, which approximates the intermediate sample $X_{i+1}$. Thereupon, this interpolative predicted value for sample $X_{i+1}$ is subtracted at subtraction circuit 124 from the actual value of that sample. Therefore, the quantity produced at the output of subtraction circuit 124 is the encoding error which will result if sample $X_{i+1}$ is encoded merely by means of interpolation, $X_{i+1} - X_{i+1}$.

In summary, the result of the joint operation of subtraction circuits 122 and 124 with combinatorial circuit 123 is the calculation of the quantizing error encountered from the encoding of sample $X_i$, the interpolation of sample $X_{i+2}$ with the reconstruction $X_i$, and the computation of the encoding error which will result if sample $X_{i+1}$ is encoded strictly by means of interpolation.

In accordance with the principles of the present invention, the quantizing error $X_i - X_i$ is averaged with the interpolation error $X_{i+1} - X_{i+1}$. This averaging process is utilized in order to simulate certain fundamental properties of the human eye. That is, it has been noted that if the eye scans a series of discrete video picture elements, a certain amount of integration occurs whereby the samples are considered jointly rather than severally. The present invention seeks to utilize this phenomenon in order to achieve some relaxation of the encoding accuracy constraints to which interpolative coding is subjected. Accordingly, an averaging process occurs at the combinatorial circuit 126, which combines successive differential quantizing error and prospective interpolative encoding error respectively produced by subtraction circuits 122 and 124, and divides the sum by two. Thus, a simple average is produced thereby.

The averaged error is then coupled to a first threshold circuit which compares the averaged error with a predetermined threshold which simulates visual acuity. In other words, the threshold circuit 127 is adjusted such that if the averaged error from combinatorial circuit 126 is small enough that it will not be detected by the viewer, the output of the threshold network 127 is maintained in a logical 0 state. If, however, the averaged error from combinatorial circuit 126 is larger than the threshold, indicating that it is large enough to be percieved by the human eye, the output of the threshold circuit 127 is maintained in a logical 1 state. It may be appreciated that if the averaged error is exactly equal to the threshold, either one of the output signals may be effectively used.

Output signals from the threshold circuit 127 are coupled to a first input of an OR gate 128. In addition, clock pulses are applied to a second input of the OR gate, 128, and signals from another threshold network 129, which shall be described hereinafter, are coupled to a third input of the OR gate 128. The switching means 104 which controls the input to the classifier 105 operates strictly under the control of the OR gate 128. Accordingly, each time a positive-going clock pulse occurs, each representing a logical 1, the output of the OR gate 128 is energized to a logical 1 state. Moreover, each time the threshold of network 127 is exceeded, the output of OR gate 128 is energized to a logical 1 state. In turn, switching means 104 is closed each time the output of OR gate 128 assumes the logical 1 state. The foregoing operation of the OR gate 128 may be interpreted as follows. Since the clock pulses have a duty cycle of two sample periods, the closing of switching means 104 each time the clock pulses go to a logical 1 condition insures that switching means 104 will be closed during alternate sampling intervals. Therefore, during every alternate interval, a differential from subtraction circuit 102 is coupled to the classifier 105 for full precision DPCM encoding. During such sampling intervals, the outputs produced by either of the threshold networks 127 or 129 is irrelevant. During alternate sampling intervals when the clock signal is in a logical 0 state, the position of the switch is controlled solely by the output status of the threshold networks 127 and 129. Since the threshold network 127 assumes a logical 1 state if the averaged error is too large to tolerate interpolative style encoding, the switching means 104 is assured of closure whenever the threshold network 127 is energized, thereby encoding the corresponding sample from the first delay element 119 differentially, rather than by means of interpolation. Thus, during alternate sampling periods, plus when the first threshold 127 is energized during intermediate sampling periods, switching means 104 is closed and the corresponding sample is encoded differentially.

Yet another means for controlling the switching means 104 is provided, one which utilizes slope overload prediction. Input samples from line 118 (designated $X_{i+2}$) are coupled to the positive input of a subtraction circuit 131, the other input of which is fed by the reconstruction $X_i$ of the encoded sample two periods previous. Hence, subtraction circuit 131 produces a signal representative of the net signal change occurring between alternative sampling periods. This quantity is useful for the following reason. In standard DPCM encoding, the operating range of the classifier needs only to be as extensive as the anticipated sample-to-sample change between successive samples. In accordance with the present invention, however, whenever interpolation is utilized, the classifier 105 must quantize a differential between alternate samples. Hence, unless further provision is made, the classifier 105 would require a range of quantizing levels twice as extensive as those utilized by standard DPCM encoders. In accordance with the principles of the present invention, the subtraction circuit 131 operates in conjunction with a slope overload threshold network 129 to relax these classifier requirements brought on by the present invention. The threshold of the slope overload threshold network 129 is adjusted such that a logical 1 is coupled to OR gate 128 and thereby to switching means 104 whenever the differential between alternate samples $X_i$ and $X_{i+2}$ is larger than the quantizing range of the classifier 105. The effect, therefore, of a differential great enough to energize the slope overload threshold network 129 is to cause the sample between the two regularly DPCM encoded samples to be encoded differentially, rather than by means of interpolation. In this situation, the classifier 105 never receives differentials which are beyond its quantizing range due to use of a two-sampling period differential. Hence, the classifier 105 is thereby subjected only to design constraints which all DPCM coders must meet.

In summary, every other sample is encoded differentially by means of closings of switching means 104 by the logical 1 clock pulses coupled to OR gate 128. For samples intermediate the full precision DPCM samples, interpolative prediction is utilized except under two conditions. First, if the average of the projected interpolative error and the quantizing error of the immediately preceding DPCM sample exceeds a threshold, switching means 104 is closed by a logical 1 signal from the first threshold network 127. Secondly, if the signal change is so extensive that use of interpolation will overload the differential encoder by forcing it to quantize samples beyond its own range, switching means 104 is closed by a logical 1 from the second threshold network 129.

A further feature of the present invention is provided because of a peculiarity in the variable length code scheme utilized. That is, due to the use of the level zero signal (i.e., a single binary one), as both a genuine DPCM signal plus a digital code word which informs the receiver that interpolation is to be utilized, decoding error may result if further provisions are not made to distinguish between these two situations. If they are not made, the receiver may become "confused" when a given sample which has a value near zero volts is normally scheduled to be encoded by interpolation, but in fact is encoded by the DPCM level zero due to the operation of either of the threshold networks 127 or 129. The problem may be avoided, however, because this situation arises whenever the two DPCM samples on either side of the scheduled interpolative sample have considerable change between them, one being near zero and the other being near to full scale amplitude. In this situation, it is clear that the encoding accuracy of the intermediate sample is by no means as critical as it is when the DPCM samples on either side are closer in magnitude to one another. In order to deal with this problem, it is a feature of the present invention that, when a sample with an actual value near zero is normally scheduled for interpolation but DPCM is instead used therefor, that sample is encoded as a level one, rather than level zero. This process intentionally introduces a small amount of error, secure in the knowledge that the signal in that area is experiencing sufficiently large change that the error will not be detectable by the observer.

This feature is provided by a pair of AND gates 109 and 131, combined with an OR gate 108. The output of OR gate 128 is coupled to a first input of the AND gate 131. In addition, complemented clock pulses are coupled to another terminal of the AND gate 131. Finally, a wire from the classifier 105, energized whenever the classifier assumes a level zero condition, is coupled to a third input of the AND gate 131. Thus, the AND gate 131 is energized upon joint occurrence of three conditions. First, due to use of complemented clock pulses, the sampling period during which the AND gate 131 is energized is one corresponding to a sample which is normally to receive interpolative encoding. Secondly, due to use of the input from OR gate 128, AND gate 131 is energized only if, due to the operation of the threshold circuits 127 or 129, the sample is to be DPCM encoded rather than by utilization of interpolation. Finally, due to use of the level zero wire from classifier 105, the magnitude of the differential being DPCM converted must be near the zero level.

Whenever these three pre-conditions occur, OR gate 108 and AND gate 109 must be conditioned first to energize the level one output and secondly to inhibit the level zero output of classifier 105. Hence, energizing signals from the AND gate 131 are passed to one input of OR gate 108, the other input of which is the level one output 107 from the classifier 105. Thus, output wire 132 from OR gate 108 is energized when an actual level one DPCM output occurs, or when the AND gate 131 is energized. In addition to being coupled to the code generator 110 and to the weighter 115, signals on wire 132 from the OR gate 108 are coupled to an inhibit input of AND gate 109. Hence, each time OR gate 108 is energized, AND gate 109 is inhibited, thereby precluding a logical 1 from being transmitted on the level zero wire.

In summary, the encoder of FIG. 1 encodes alternate samples in a standard DPCM fashion. Except when either of a pair of thresholds is exceeded, intermediate samples are converted by interpolation, transmission of a code word corresponding to the level zero position indicating to the receiver that interpolation is to occur. Under certain conditions, when use of this level zero might result in decoding error, a level one condition is instead established and a level zero is inhibited.

FIG. 3A shows a decoder which embodies the principles of the present invention and which is designed to operate in synchronous harmony with the encoder of FIG. 1. Transmitted signals are first coupled to a buffer 200 which stores them until the encoder is able and ready to process them. Thereupon, received signals are coupled from the buffer 200 to a demultiplexer 211. The demultiplexer 211 functions to separate synchronization and timing information from the actual encoded message signal. Hence, buffer 200 and demultiplexer 211 combine to reverse the processes accomplished in the encoder by the output buffer and multiplexer 111. Once the demultiplexer 211 separates the respective types of information from one another, both classes of information are coupled to respective apparatus for decoding operations.

All of the timing information extracted from the transmitted message waveforms is coupled to a sync. decoder 250. Thereupon, horizontal and vertical synchronizing signals are separated from one another, are placed in an appropriate format to drive a display, and are coupled thereto. In addition, in order for the decoder to run at a desired rate and in harmony with the extracted horizontal and vertical synchronizing signals, a clock pulse waveform is synthesized. More particularly, in order that the decoder of FIG. 3A might operate effectively according to plan, the decoder clock is as represented by the first waveform of FIG. 3B, having the same period as, but being one half period out of phase with, the encoded clock. In FIG. 3B this waveform is contrasted with a corresponding encoder clock waveform. The significance of this phase relationship is detailed hereinafter.

The message signal less synchronizing and timing information is coupled to a variable length decoder 210. The decoder 210 is designed simply to reverse the coding processes which is provided in the encoder of FIG. 1 by the code generator 110. Since the code generator 110 associated the various quantizing levels with the variable length code of FIG. 2, the variable length decoder 210 merely reassociates the variable length code of FIG. 2 with the corresponding levels. Therefore, the output of the variable length decoder 210 is quite similar to that produced in the FIG. 1 encoder by the classifier 105. In FIG. 3A, a plurality of wires 206, 207, etc., represent the quantizing levels 4 through +4. In response to receipt of a given variable length code word (e.g., the word 0001), an associated wire is energized (in the example, wire 208, representing level +2 is energized to logical 1).

All of the wires 206, 207, etc., from the variable length decoder are coupled to a weighting circuit 215 which is identical to the weighting circuit 115 of the FIG. 1 encoder. The weighting circuit 215 therefore performs the function of associating a sample reconstruction of appropriate magnitude when the corresponding wire from the decoder 210 is energized to a logical 1 state. Hence, at the output of the weighting circuit 215, reconstructed quantized differentials are represented.

The reconstructed differentials are coupled to an accumulator made up of an adding circuit 216 and a one sample delay element 217. It may be seen that each differential is combined by the adder with the reconstruction of an immediately previous sample reconstruction, thereby producing a reconstruction of the corresponding present sample. Due to the feedback connection from the output of sample element 217, this process continues iteratively. For example, if the differential corresponding to the interval between sample $X_{i+1}$ and sample $X_{i+2}$ is coupled from the weighter 215 to the adder 216, it is then combined with reconstruction $X_{i+1}$ to produce the reconstruction $X_{i+2}$. Since this DPCM type reconstruction is to be used in exactly that form by the display for at least one half the samples, reconstructed samples from the output of delay element 217 are coupled directly to a first output terminal 251. In addition, they are coupled to a second one sample delay element 252. Hence, when the reconstruction $X_{i+1}$ appears at output terminal 251 and at the input of delay element 252, the reconstruction $X_i$ is represented at the output of delay element 252.

In order to produce the sample interpolations which may be used for alternate picture elements, a combinatorial circuit 266 adds together the quantities produced at its input and divides them by two. More particularly, the quantities utilized are the reconstructions represented at the respective outputs of delay element 252 and adder 216. It may be seen that those reconstructions represent samples which are separated by two sampling periods due to the delays afforded by the delay elements 217 and 252. For the example shown, the reconstructions $X_i$ and $X_{i+2}$ are applied to the combinatorial circuit 226, thereby producing the interpolated approximation $X_{i+1}$ of the intermediate sample. This interpolated approximation is coupled to a second output terminal 254.

In summary, the decoding operations afforded by the variable length decoder 210, the weighter 215 and the combination of delay elements 217 and 252 with the adder 216 and the combinatorial circuit 226 afford a dual decoding of each digital word which is received. For every picture element, a reconstructed DPCM quantity is produced at a first output terminal 251, while an interpolated approximation of the same sample is represented at a second output terminal 254. Thus, the quantity which actually is coupled to the display depends upon the position of a switching means 204. Whenever switching means 204 is closed to terminal 254, an interpolated approximation of a picture element is coupled to a display. Otherwise, switching means 204 is closed to terminal 251, thereby coupling a reconconstruction of a picture element converted in the DPCM fashion.

It may be recalled that interpolation is to be utilized for the encoding of signals intermediate the alternate successive samples which always are encoded by DPCM. Each "level zero" transmitted during logical 1 encoder clock half periods corresponds to a differential of zero amplitude, but each logical 0 during encoder clock half periods indicates use of interpolation. Moreover, joint occurrence of a logical 0 in the encoder clock and a "level zero" encoded output word corresponds to the only circumstances when interpolation is to be utilized, since whenever the normally interpolated sample is near zero but is to be encoded by DPCM, a "level one" signal is substituted for the normal "level zero" signal. In accordance with these observations, the decoder of FIG. 3A is designed such that switching means 204 normally remains closed to output terminal 251 (i.e., when the output of AND gate 255 is a logical 0), thereby coupling a DPCM reconstruction to the display.

From FIG. 3B, it is evident that the half period phase delay of the encoder clock relative to the decoder clock results in a logical 1 at the decoder whenever the encoder clock produced a logical 0. A single sample delay is afforded at element 257 to compensate for that of element 217. Hence, AND gate 255 is energized by joint occurrence of a logical 1 in the decoder clock signal from the sync decoder 250 and a "level zero" signal from the output wire 206 of the variable length decoder. One sampling period after these conditions are both met, the logical 1 output from AND gate 255 appears at the output of delay element 257 and closes switching means 204 to output terminal 254. At that point in time, a corresponding interpolated approximation is coupled to the display.

The apparatus of FIG. 3A therefore operates as follows. For every decoder clock half period, a different differential is coupled to adder 216 for synthesis of a reconstruction. For those half clock periods in which interpolation is to be used, a differential of zero amplitude is coupled to the adder 216, thereby coupling a reconstruction of the previous DPCM sample to output terminal 251. During such times, however, switching means 204 is closed to output terminal 254, thereby coupling a meaningful interpolated sample to the display. During those times in which a sample normally scheduled for interpolation is encoded in DPCM fashion an interpolation will be produced at output terminal 254, but this interpolation is meaningless from the standpoint of the display. However, lack of an energizing signal at the control input of switching means 204 causes switching means 204 to be maintained at output terminal 251, thereby coupling a DPCM reconstruction to the display.

The foregoing embodiments have utilized DPCM coding throughout. It is apparent, however, that virtually any sort of convenient analog-to-digital and digital-to-analog conversion might be utilized. In any event, the principles of the present invention, which revolve principally about the use of averaged error for control of interpolative coding, are unaffected by the choice of code utilized.

Likewise, the foregoing embodiments have consistently utilized analog type samples and reconstructions for internal functions. It is quite obvious that digital quantities may likewise be used throughout. The only modification which then would be required would be a preliminary analog-to-digital conversion at input terminal 118 of FIG. 1, and a corresponding digital-to-analog conversion on the output line, to the display of the FIG. 3 decoder.

What is claimed is:

1. An analog-to-digital converter comprising:

means for providing first, second, and third samples;

translation means having an input terminal and a control terminal for energizing said translation means;

means for coupling samples to said input terminal in chronological sequence;

means for energizing said translation means to translate said first and third samples as they occur;

means for interpolating said first and third samples; and characterized by means for developing an averaged error signal of a. the difference between said second sample and an interpolation from said means for interpolating, and b. the difference between a translated version of a sample from said translation means and the actual value thereof;

threshold means for energizing said translation means to translate said second sample when said averaged error is greater than a predetermined level; and said translation means includes signal means for producing a first predetermined digital word when said averaged error is smaller than said predetermined level.

2. A converter as defined in claim 1 and further including means for inhibiting said signal means and further for producing a second predetermined digital word whenever said translation means is energized to translate said second sample and said second sample translates as zero amplitude.

3. An analog-to-digital converter comprising:

means for providing first, second, and third samples;

translation means having an input terminal and a control terminal for energizing said translation means;

means for coupling samples to said input terminal in chronological sequence;

means for energizing said translation means to translate said first and third samples as they occur;

means for interpolating said first and third samples; and characterized by means for developing an averaged error signal of a. the difference between said second sample and an interpolation from said means for interpolating, and b. the difference between a translated version of a sample from said translation means and the actual value thereof;

threshold means for energizing said translation means to translate said second sample when said averaged error is greater than a predetermined level;

said translation means includes accumulator means responsive to encoded digital words for developing reconstructions of corresponding signal samples; and said means for developing an averaged error includes:

a. means for producing the interpolation of said third sample with a reconstruction of said first sample, b. first means for developing the difference between said second sample and an interpolation from said means for producing, c. second means for developing the difference between said first sample and a reconstruction thereof, and d. means for averaging the differences produced by said first and second means for developing.

4. An analog-to-digital converter comprising:

means for providing first, second, and third samples;

translation means having an input terminal and a control terminal for energizing said translation means;

means for coupling samples to said input terminal in chronological sequence;

means for energizing said translation means to translate said first and third samples as they occur;

means for interpolating said first and third samples; and characterized by means for developing an averaged error signal of a. the difference between said second sample and an interpolation from said means for interpolating, and b. the difference between a translated version of a sample from said translation means and the actual value thereof;

threshold means for energizing said translation means to translate said second sample when said averaged error is greater than a predetermined level; and means for coupling said second sample to said translation means when the difference between said first and third samples exceeds a second threshold level.

5. An analog-to-digital converter comprising:

delay means for providing a present sample, a previous sample and a subsequent sample;

differential coding means, including accumulator means for developing reconstructions of a priorly encoded sample, for producing a digital output signal;

means for coupling said present sample to said coding means for differential encoding with a reconstruction of said previous sample;

means, responsive to said accumulator means, for interpolating a reconstruction of said previous sample with said subsequent sample;

first subtraction means for developing the quantizing error resulting from the encoding of said previous sample;

second subtraction means for developing the difference between said present sample and the quantity produced by said means for interpolating;

combining means for developing the average of the quantities produced by said first and said second subtraction means;

means for comparing the average from said combining means with a predetermined threshold level; and means, responsive to said means for comparing for energizing said coding means to encode said present sample whenever the average is greater than said threshold.

6. A converter as defined in claim 5 wherein said differential coding means includes signal means for developing a predetermined digital word when an average from said combining means is less than said predetermined threshold level.

7. A converter as defined in claim 6 and further including means for inhibiting said signal means and further for producing a second predetermined digital word whenever said present sample is coupled to said differential coding means and corresponds to a quantization level of zero amplitude.

8. A converter as defined in claim 5 and further including:

third subtraction means for developing the difference between said subsequent sample and a reconstruction of said previous sample;

second threshold means for comparing the difference from said third subtraction means with a second predetermined threshold level, said means for energizing said coding means being further energized when the difference from said third subtraction means is larger than said second predetermined threshold level.

* * * * *

UNITED STATES PATENT OFFICE
CERTIFICATE OF CORRECTION

Patent No. 3,824,590 Dated July 16, 1974

Inventor(s) John Ormond Limb

It is certified that error appears in the above-identified patent and that said Letters Patent are hereby corrected as shown below:

Column 3, line 34, change "4" to -- -4 --.

Column 4, line 42, change "$X_N$" to --$\hat{X}_N$--, at the end of the line change "$X_i$" to --$\hat{X}_i$--;

line 44, change "$X_i$" to --$\hat{X}_i$--;

line 50, change "$X_i - X_i$" to --$X_i - \hat{X}_i$;

line 52, change "$X_i$" to --$\hat{X}_i$--;

line 58, change "$X_{i+1} = (X_{i+2} + X_i)/2$" to --$\bar{X}_{i+1} = (X_{i+2} + \hat{X}_i)/2$--;

line 65, change "$X_{i+1} - X_{i+1}$" to --$X_{i+1} - \bar{X}_{i+1}$--.

Column 5, line 3, change "$X_i$" to --$\hat{X}_i$--;

line 7, change "$X_i - X_i$" to --$X_i - \hat{X}_i$--;

line 9, change "$X_{i+1} - X_{i+1}$" to --$X_{i+1} - \bar{X}_{i+1}$--.

UNITED STATES PATENT OFFICE

CERTIFICATE OF CORRECTION

Patent No. 3,824,590 Dated July 16, 1974

Inventor(s) John Ormond Limb

It is certified that error appears in the above-identified patent and that said Letters Patent are hereby corrected as shown below:

Column 6, line 20, change "$X_i$" to --$\hat{X}_i$--;

line 42, change "$X_i$" (first occurrence) to --$\hat{X}_i$--.

Column 8, line 57, change "4" to -- -4 --.

Column 9, line 17, change "$X_{i+1}$" to --$\hat{X}_{i+1}$--, change "$X_{i+2}$" to --$\hat{X}_{i+2}$--;

line 23, change "$X_i$" to --$\hat{X}_i$--;

line 25, change "$X_i$" to --$\hat{X}_i$--;

line 29, change "266" to --226--;

line 37, change "$X_i$" to --$\hat{X}_i$--, change "$X_{i+2}$" to --$\hat{X}_{i+2}$--;

line 39, change "$X_{i+1}$" to --$\bar{X}_{i+1}$--.

Signed and sealed this 19th day of November 1974.

(SEAL)
Attest:

McCOY M. GIBSON JR.
Attesting Officer

C. MARSHALL DANN
Commissioner of Patents